United States Patent
Shibilski et al.

(10) Patent No.: US 6,170,241 B1
(45) Date of Patent: Jan. 9, 2001

(54) MICROPROCESSOR CONTROLLED MOTOR CONTROLLER WITH CURRENT LIMITING PROTECTION

(75) Inventors: John Shibilski, Greendale, WI (US); James B. Farr, Ann Arbor, MI (US); Joseph L. Pfaff, Wauwatosa, WI (US)

(73) Assignee: Tecumseh Products Company, Tecumseh, MI (US)

( * ) Notice: Under 35 U.S.C. 154(b), the term of this patent shall be extended for 0 days.

(21) Appl. No.: 08/846,068

(22) Filed: Apr. 25, 1997

Related U.S. Application Data (60) Provisional application No. 60/017,051, filed on Apr. 26, 1996.

(51) Int. Cl.$^7$ .................................................. A01D 34/78
(52) U.S. Cl. ........................ 56/11.9; 56/10.2 R; 318/434
(58) Field of Search ........................ 56/10.2 A, 10.2 R, 56/10.2 E, 11.9, 26, 25.4, 249; 174/50, 53; 339/176, 177; 318/254, 138, 439, 434

(56) References Cited

U.S. PATENT DOCUMENTS

| | | | |
|---|---|---|---|
| 3,581,480 | 6/1971 | O'Connor | 56/11.9 |
| 4,145,864 | 3/1979 | Brewster | 56/10.2 |
| 4,528,486 | * 7/1985 | Flaig et al. | 318/254 |
| 4,558,281 | 12/1985 | Codd | 324/433 |
| 4,967,544 | 11/1990 | Ziegler | 56/10.2 |
| 5,022,587 | 6/1991 | Hochstein | 239/72 |
| 5,085,043 | 2/1992 | Hess | 56/10.5 |
| 5,490,370 | 2/1996 | McNair | 56/11.9 |
| 5,502,957 | 4/1996 | Robertson | 56/11.9 |
| 5,606,851 | 3/1997 | Bruener | 56/11.9 |

OTHER PUBLICATIONS

"Industrial Control Applications", Motorola Inc., First Edition DL412/D Rev. 1, 1994.

* cited by examiner

Primary Examiner—Thomas B. Will
Assistant Examiner—Robert Pezzuto
(74) Attorney, Agent, or Firm—Baker & Daniels (57) ABSTRACT

A solid motor controller for controlling the current in an electrical motor. The motor controller includes a processing unit, and a solid state switch operatively connected to the electrical motor. The motor controller senses the current through the motor, compares the current with a reference current level, and limits the current in the motor by rapidly switching the switch between an ON and an OFF state when the current exceeds the reference current level. The controller de-energizes the motor by placing the switch in the OFF state when the current exceeds the reference current for a predetermined period of time. The controller also includes a second solid state switch which is controlled to rapidly stop the rotation of the motor. The motor controller also activates a high current warning when the current exceeds a high current limit. Further, the motor controller senses the battery voltage, provides a low voltage warning indication when the battery voltage falls below a predetermined value, and shuts down the motor when the battery voltage falls below a second predetermined value. Finally, the controller measures the temperature near a selected component and shuts down the motor when the temperature exceeds a predetermined value.

20 Claims, 5 Drawing Sheets

MICROPROCESSOR CONTROLLED MOTOR CONTROLLER WITH CURRENT LIMITING PROTECTION

CROSS REFERENCE TO RELATED APPLICATIONS

This application claims the benefit under Title 35 U.S.C. §119(e) of United States Provisional Application Serial No. 60/017,051 filed Apr. 26, 1996.

BACKGROUND OF THE INVENTION

1. Field of the Invention

The present invention relates to motor controllers and in particular to solid state motor controllers for electric motors adapted for use with portable power equipment, such as lawn and garden equipment.

2. Related Art

Motor controllers are designed to interrupt power to a motor in the event of a fault in the motor. A fault in the motor can cause excessive current to flow through the motor windings and thereby overheat the windings and damage the motor.

To provide overcurrent protection, motor controllers on small motors typically use a relay approach. In the relay approach, when an overcurrent condition is sensed, a circuit breaker connected in series with the motor trips open to interrupt current flow to the motor and halt the motor.

However, circuit breakers do not limit current, they merely interrupt the current path when a particular current threshold has been exceeded for a certain period of time. A problem with using mechanical devices such as circuit breakers to interrupt the current path is that there can be a significant delay between the time the high current condition occurs and the time the circuit breaker trips open. Due to the time delay, high current can flow to the motor as well as to other components of the system before the circuit breaker opens, thereby causing damage to the system. This can be a particular problem with small motors which may be easily damaged by rapid power surges and for which the aprroach may be ineffective.

Another problem with the relay approach is that the circuit breaker is either shut or tripped open. If the current is below a threshold, the circuit breaker remains shut, but if the current exceeds the threshold, the circuit breaker trips open to interrupt the current path. Such an approach is susceptible to spurious trips from transients. If the circuit breaker opens during momentary transients, the operator is forced to reset the circuit breaker before the motor can be restarted thereby causing unnecessary delay and inconvenience.

Also, circuit breaker based protection systems do not readily lend themselves to the addition of auxiliary control features, for example, thermal protection and battery monitoring, in a compact, integrated package.

Therefore, what is needed is a motor controller which can quickly and reliably limit motor current flow and thereby prevent excessively high current through the motor and the system, even for sharp power surges.

What is also needed is a motor controller which can automatically shut down the motor if current limiting is required for a predetermined period of time.

What is also needed is a motor controller which is capable of quickly stopping the motor after an automatic shutdown condition occurs.

What is also needed is a motor controller which provides the flexibility to easily add additional control features for operator interface.

What is also needed is a motor controller which includes the above-cited feature and is adapted for use with portable power equipment, such as lawn and garden equipment.

SUMMARY OF THE INVENTION

The motor controller of the present invention is a solid state based motor controller which includes a microprocessing unit to provide a number of advantages over motor controllers using a relay approach, particularly in portable equipment applications. The microprocessing unit comprises any IC device capable of accepting input signals comparing the input signals with predetermined thresholds and providing output signals based on the input signals, the comparison or any programmed manipulation of the input signals. A solid state design that uses a microprocessor is better from a reliability standpoint because the current can be easily limited to any chosen level. A solid state design is also advantageous because many other features can easily be added, for example, a battery level indicator or a load level gauge, to the overall control package.

In the present motor controller, the microprocessor senses the current through the motor, compares the sensed motor current with a first current threshold level and provides a warning if the sensed motor current exceeds the first current threshold level. The microprocessor also compares the sensed motor current with a second current threshold level and actuates a current limiting device if the sensed motor current exceeds the second current threshold level. If the current limiting condition, namely the sensed current exceeding the second current threshold level, exists for a predetermined period of time, the microprocessor shuts down the motor.

In one form thereof, the motor controller includes first and second solid state switches, connected to the microprocessor through a driver unit, for limiting the current through the motor and for shutting down the motor. The current limiting feature is implemented by rapidly switching the first solid state switch, which is connected in series with the motor and the power source, between an ON and an OFF state. The rapid switching prevents the current through the motor from rising above a predetermined level. The motor is shut down by placing the first solid state switch in the OFF state and rapidly switching the second solid state switch, which is connected in parallel with the motor, between an ON and an OFF state to quickly dissipate the energy in the motor windings and stop the motor.

In applications where the motor is driven by a battery, particularly portable lawn and garden equipment, the microprocessor also senses the battery voltage level and actuates a warning if the battery voltage falls below a first voltage threshold level, and shuts down the motor if the battery voltage falls below a second voltage threshold level. The microprocessor also senses the temperature around a selected component and shuts down the motor if the sensed temperature exceeds a predetermined temperature threshold level. The motor shutdown is rapidly achieved using the method described above.

BRIEF DESCRIPTION OF THE DRAWINGS

The above-mentioned and other features and objects of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views. Although the drawings represent an embodiment of the present invention, the drawings are not necessarily to scale and certain features may be exaggerated in order to better illustrate and explain the present invention. The exemplification set out herein illustrates an embodiment of the invention, in one form, and such exemplification is not to be construed as limiting the scope of the invention in any manner.

DETAILED DESCRIPTION OF THE INVENTION

The embodiment disclosed below is not intended to be exhaustive or limit the invention to the precise form disclosed in the following detailed description. Rather, the embodiment is chosen and described so that others skilled in the art may utilize its teachings.

The present invention is a microprocessor controlled motor controller which uses a current limiting device to prevent excessive current though an electric motor. The present invention is particularly suitable for use with common portable lawn and garden maintenance equipment. Such lawn and garden maintenance equipment usually comprise a rotating blade operatively coupled to a shaft of the electric motor. Such lawn and garden maintenance equipment include, but is not limited to, lawn mower, tiller, snowblowers, and the like.

Figure 5:
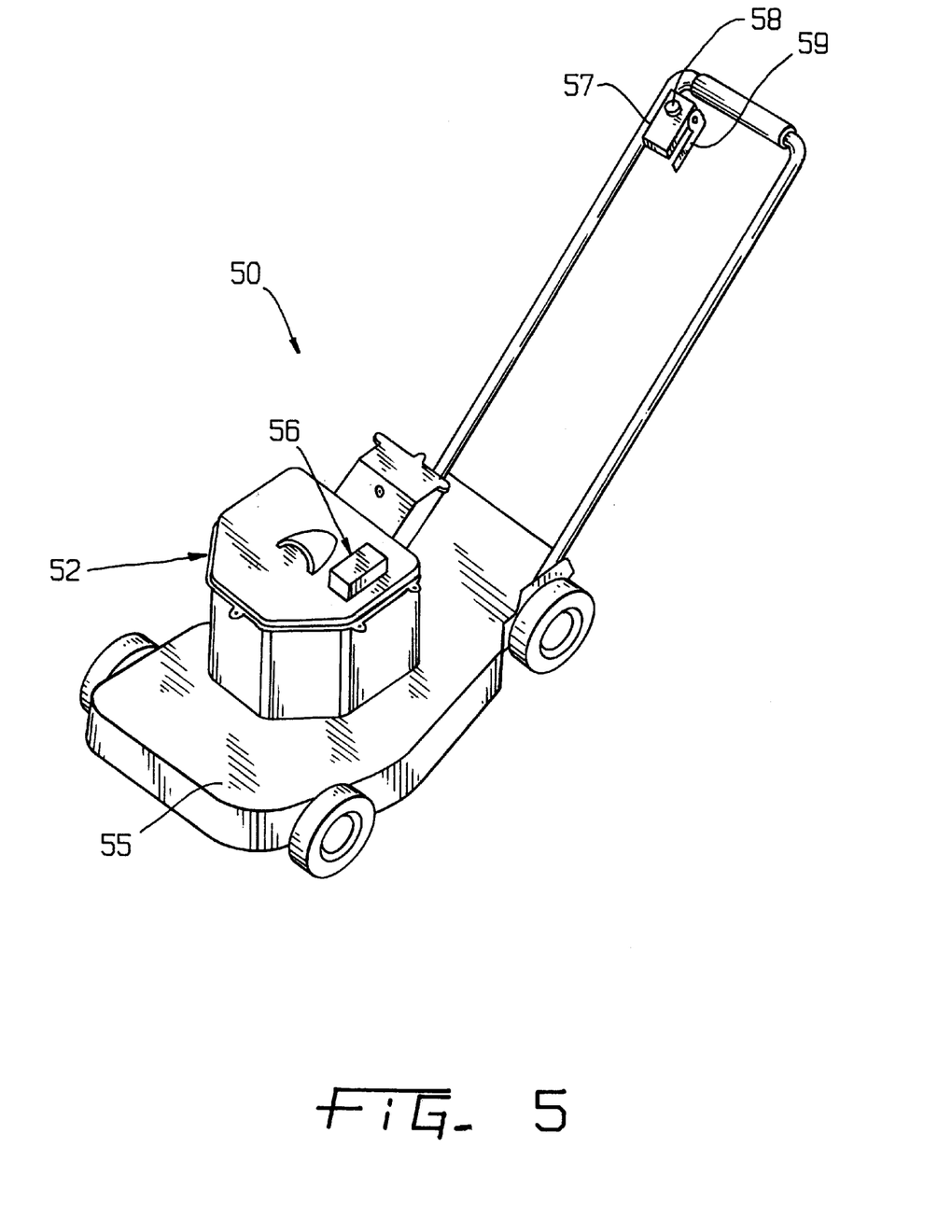
FIG. 5 is a perspective view of a lawn mower showing the motor controller of the present invention attached thereon.

FIG. 5 illustrates a conventional lawn mower 50 having electric motor and power supply assembly 52 which comprises motor M1 operatively coupled to a rotating blade (not shown) disposed under deck 55 and controlled by motor controller 10 which is contained in housing 56. Lawn mower 50 includes operator-controlled bail switch assembly 57. For clarity, the various wire connections are not shown in FIG. 5. It is to be understood that a variety of equipment arrangements are possible and motor controller housing 56 may be placed at many different locations on the lawn and garden equipment.

Figure 1:
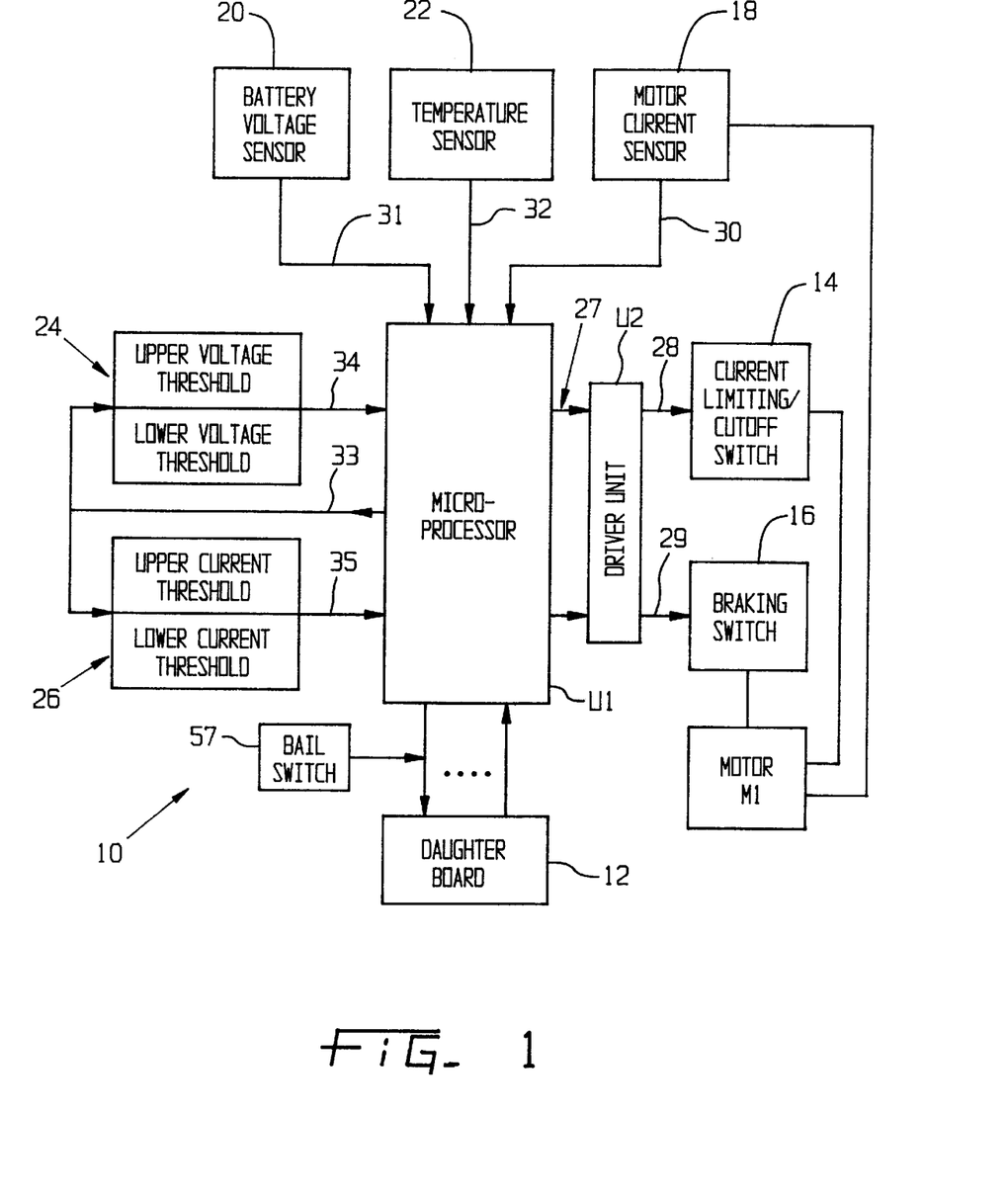
FIG. 1 is a block diagram of the motor controller of the present invention.

Referring to FIG. 1, motor controller 10 comprises processing unit U1 which is operatively connected to and controls the operation of motor M1. Motor M1 may comprise any suitably sized motor used in portable lawn and garden maintenance equipment, for example, fractional and integral horsepower motors. An operator controls the starting and stopping of motor M1 using bail switch assembly 57 coupled to motor controller 10 via wire harnesses connected to motor controller 10. When present motor controller 10 and motor M1 are used in lawn and garden maintenance equipment, such as lawnmowers, the operator-controlled bail switch assembly 57 may comprise any one of a number of conventionally known bail assemblies which require the user to actuate both a start button and a control lever. Such bail assemblies include, but are not limited to, model no. 602392 manufactured by Capro Inc. of Swainsboro, Ga.

As shown in FIG. 5, operator-controlled bail switch assemblies may comprise start button 58 and lever 59 which must be actuated at the same time to start motor M1. To start motor M1, the user first depresses start button 58 and keeps start button 58 depressed while drawing lever 59 toward the end of the lawnmower handle. When lever 59 has reached the run position, start button 58 is locked in and may be released. Thus, the start procedure requires the user to use both hands. When a trip condition occurs and motor M1 is shut down, start button 58 is released from the locked in position. To restart the motor, the user must release lever 59 and repeat the start procedure.

Processing unit U1 may comprise any IC data processing device capable of and programmed for accepting input signals, comparing the input signals with predetermined threshold levels and/or manipulating the input signals or comparison data as required, and outputting various control signals in response to the input signals and/or signal manipulations or comparisons. In the disclosed embodiment, processing unit U1 comprises processor PIC16C620 manufactured by Microchip Technology of Chandler, Ariz.

As shown in FIG. 1, processing unit U1 is connected to various sensors and threshold level circuits in order to sense various parameters, compare the sensed parameters with various threshold levels and provide outputs to control motor M1 and actuate warning indicators. Processing unit U1 senses the current in motor M1 via sensing line 30 of motor current sensor 18, the temperature around a selected component via sensing line 32 of temperature sensor 22, and the voltage of supply battery (not shown) via sensing line 31 of battery voltage sensor 20. Processing unit U1 is also connected to voltage threshold circuit 24 and current threshold circuit 26 via input lines 34 and 35, respectively. Threshold circuits 24 and 26 each provide an upper or lower threshold level on input lines 34 and 35 depending on the output on output line 33.

Processing unit U1 compares the sensed motor current with the upper and lower current threshold levels provided on input line 35, to control the operation of motor M1. If the sensed motor current exceeds the lower current threshold level, processing unit U1 actuates a high current warning indicator disposed on daughterboard 12. If the sensed motor current exceeds the upper current threshold level, processing unit U1 actuates current limiting protection using current limiting/cutoff switch 14 as described further below. If the current limiting condition continues for more than a predetermined period of time, six seconds in the present case, processing unit U1 shuts down motor M1 using a combination of current limiting/cutoff switch 14 and braking switch 16, as also described further below. Driver unit U2 provides sufficient power to drive switches 14 and 16 between the ON and OFF states.

Processing unit U1 also compares the sensed battery voltage with the upper and lower battery threshold levels provided on input line 34. If the battery voltage falls below the upper voltage threshold level, processing unit U1 actuates a low battery voltage warning indicator on daughterboard 12. If the battery voltage falls below the lower voltage threshold level for a predetermined period of time, indicating the battery is almost completely discharged, processing unit U1 shuts down motor M1 and keeps the low battery voltage warning indicator in the ON condition after motor M1 has been shut down.

Finally, if the temperature sensed by temperature sensor 22 exceeds a predetermined temperature threshold level, processing unit U1 shuts down motor M1. The details of motor controller 10 are now described below.

Figure 2:
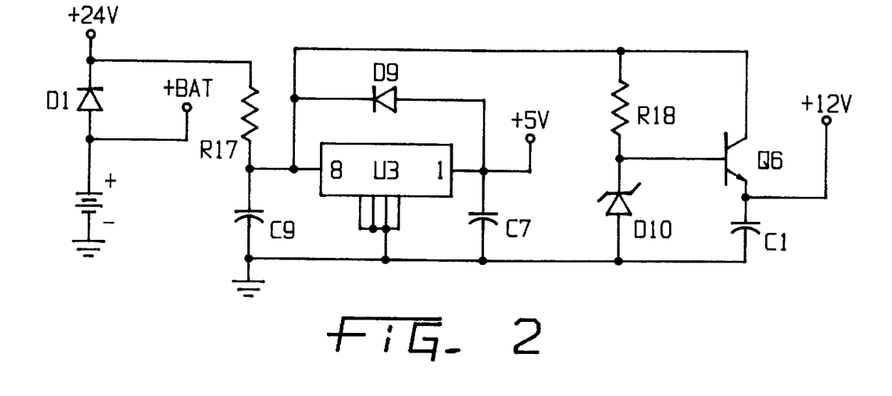
FIG. 2 is a schematic diagram of the power supply for the motor controller of the present invention.

The power supply for motor controller 10 is shown in FIG. 2. Filtered +24 V is initially provided by a supply battery (not shown) through battery positive 4, battery negative J5, D1, R17, and C9. The +5 V power supply comprises voltage regulator U3, D9 and C7. The +12 V power supply to driver unit U2 comprises R18, D10, Q6, and C1.

Figure 3A:
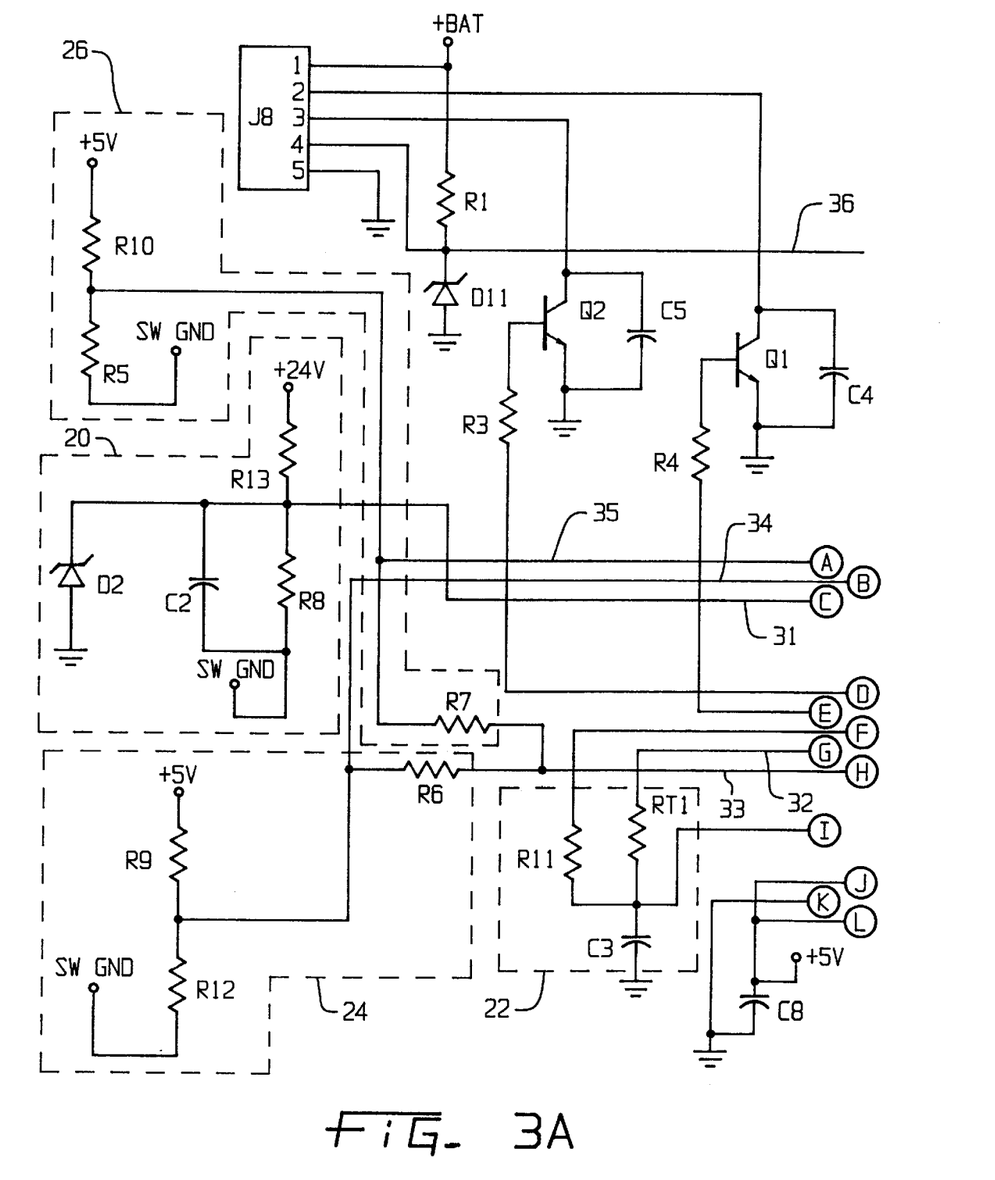
FIGS. 3A–B are schematic diagrams of the motor controller of the present invention.
Figure 3B:
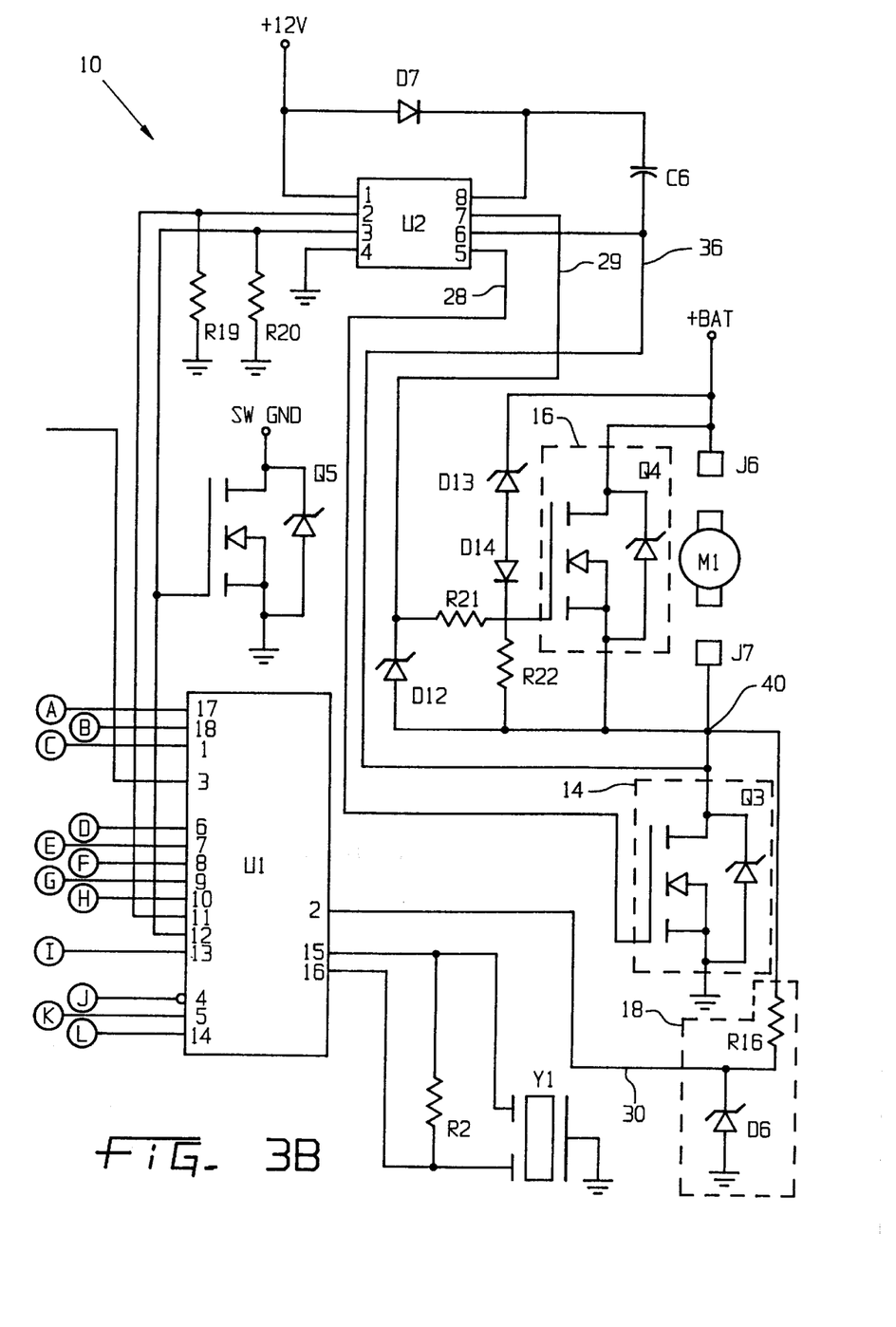
Figure 4:
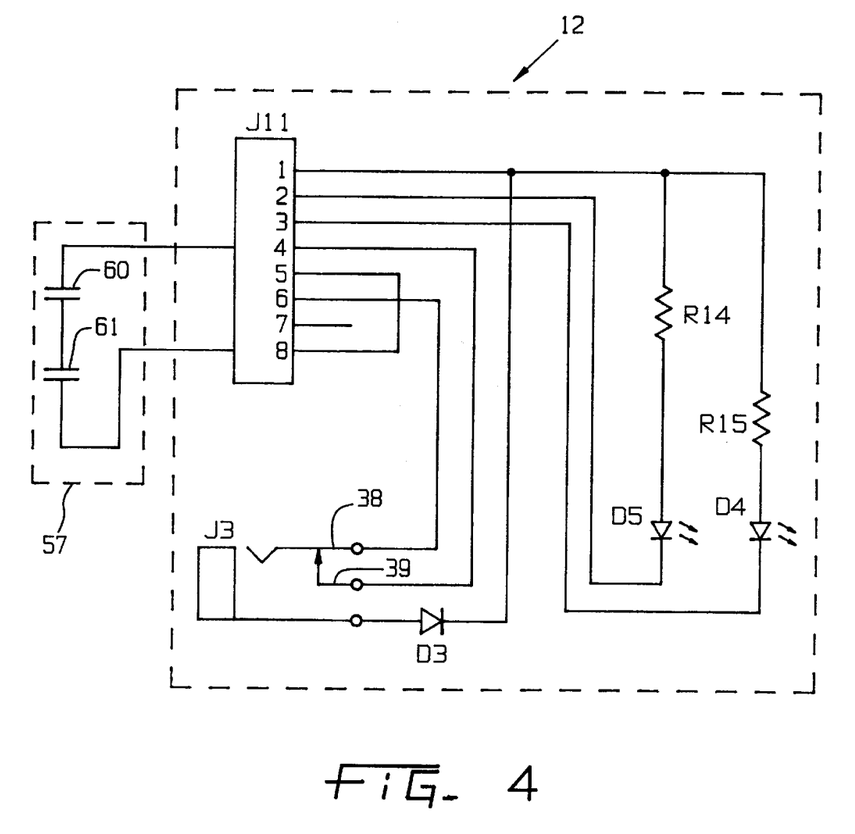
FIG. 4 is a schematic diagram of the daughterboard of the present invention.

As shown in FIGS. 3–4, motor M1 is connected to the supply battery through connections J6 and J7. Connection J6 is connected to the positive terminal of the battery and J7 is connected to ground via current limiting/cutoff switch 14 which comprises power MOSFET Q3. Power MOSFET Q3 is connected in series between connection J7 and ground and controls the current flow through motor M1. When power MOSFET Q3 is turned ON, current can flow through motor M1. When power MOSFET Q3 is turned OFF, current flow through motor M1 is interrupted. The state of power MOSFET Q3 is controlled by processing unit U1 through output pin 5 of driver unit U2.

Processing unit U1 senses current flow through motor M1 via motor current sensor 18, which comprises R16 and D6, by sensing the current flow through power MOSFET Q3. Since the voltage across power MOSFET Q3 varies linearly with the current flowing through power MOSFET Q3, the voltage across power MOSFET Q3 is proportional to the current through motor M1. Current sensing line 30 is connected to pin 2 of processing unit U1. The other end of sensing line 30 is connected between R16 and D6, which are connected in parallel with power MOSFET Q3. Zener diode D6 clamps the voltage on sensing line 30 to prevent excessive input voltage on pin 2.

During normal operation, processing unit U1 compares the sensed motor current with an upper and a lower current threshold level provided by current threshold circuit 26, which comprises a voltage divider circuit having R5, R7 and R10. The current threshold level is provided at pin 17.

The current threshold level is alternated between the upper and lower current threshold levels by alternating the output of pin 10 of processing unit U1. When the output of pin 10 is low, at ground level in this case, R7 and R5 are in parallel and sensing line 35 provides the lower current threshold level. When the output of pin 10 is high, 5 V in this case, R7 and R10 are in parallel and sensing line 35 provides the upper current threshold level. Processing unit U1 alternately receives these current threshold levels at pin 17 and compares these levels with the sensed current level received at pin 2.

The current threshold levels may be adjusted as desired by adjusting the values of resistors R5, R7 and R10. In this case, current threshold circuit 26 provides a lower current threshold level of about 28 amps and an upper current threshold level of about 50 amps. The lower current threshold level is used in conjunction with a high current warning indicator. The upper current threshold level is used to activate the current limiting function and the motor shutdown function.

When the current level sensed at pin 2 exceeds the lower current threshold level provided at pin 17, processing unit U1 activates high current warning indication LED D5 on daughterboard 12. The warning indicators are disposed on daughterboard 12 which comprises wiring harness J11, DC jack J3, and LED's D4 and D5. Daughterboard 12 is connected to motor controller 10 through wire harness J8 and powered through R1 and D11. To activate the high current warning indicator, processing unit U1 provides a high output at output pin 7, which turns ON transistor Q1, which in turn allows current flow through LED D5. Capacitor C4 is connected across transistor Q1 to reduce the voltage fluctuation across transistor Q1.

In lawn and garden power equipment application, the warning notifies the user of a possible obstruction in the blade or rotating member coupled to the motor. For example, in the case of a lawnmower, the warning indication notifies the user of a reduced quality of cut, possibly due to obstruction or build-up of grass around the blade, and that continued use may reduce the performance of the unit. The user may then attempt to improve the unit performance by, for example, raising the deck, cutting at a slower pace and/or reducing the width of the cut.

As noted above, when the current level sensed at pin 2 exceeds the upper current threshold level provided at pin 17, processing unit U1 activates the current limiting feature, and when the current limiting condition continues for more than about six seconds, processing unit U1 shuts down motor M1. Processing unit U1 limits the current through motor M1 by controlling the state of power MOSFET Q3 and shuts down motor M1 by controlling the state of power MOSFET Q3 and the state of braking switch 16 which comprises MOSFET Q4. The states of power MOSFETs Q3 and Q4 are controlled via output pins 5 and 7 of driver unit U2.

Power MOSFET Q3 is maintained in the ON state when motor M1 is energized and in the OFF state when motor M1 is deenergized. However, during the current limiting condition, power MOSFET Q3 is rapidly switched between the ON and OFF states to limit the current through motor M1. When power MOSFET Q3 is turned OFF, the current through motor M1 begins to decay. By rapidly switching power MOSFET Q3 ON and OFF, the motor current can be switched between a rising and decaying state and thus maintained below a predetermined value. Therefore, processing unit U1 controls the current limiting feature by controlling the switching action of power MOSFET Q3. In the present invention, current through motor M1 is limited to less than about 50 amps, corresponding to about 0.6 V–0.7 V on sensing line 30.

When the current limiting condition continues for about six seconds, processing unit U1 shuts down motor M1 by interrupting the current and braking motor M1. Placing power MOSFET Q3 in the OFF state interrupts the current through motor M1 and rapidly switching MOSFET Q4 between the ON and OFF states brakes motor M1. As shown in FIG. 3B, the source and drain of MOSFET Q4 are connected directly across motor M1 to provide a short circuit across motor M1 when MOSFET Q4 is turned ON. As described below, rapidly switching MOSFET Q4 ON and OFF provides a periodic short circuit to rapidly stop motor M1 within a predetermined time period. It is important to note that MOSFETs Q3 and Q4 are not ON at the same time.

As is known, a motor acts as an inductive load which stores energy. To rapidly stop the motor, the stored energy must be rapidly dissipated. With the short circuit, the combination of wires, motor windings and MOSFET Q4 quickly dissipates the energy stored in motor M1. The energy is quickly dissipated by allowing short circuit current to flow through power MOSFET Q4 and associated wiring as MOSFET Q4 is rapidly switched ON and OFF.

Also, the short circuit provided by MOSFET Q4 allows the energy to be safely dissipated through a solid state device disposed in an enclosure rather than through the outer enclosure of the power equipment thereby providing additional protection for the operator. For example, in the case of many lawnmower designs, the stored energy is dissipated by running a high current pulse through exterior portions of the lawnmower. Releasing such energy so close to the user can be a hazard. The present invention obviates this problem by dissipating the energy through the MOSFET and other internal components.

The combination of D12, R21, R22, D13 and D14, protects MOSFET Q4 against voltage spikes and sets the gate voltage as necessary. Processing unit U1 places MOSFET Q4 in the ON or OFF state via output line 29 connected to driver unit U2. The combination of D13 and D14 pulls up MOSFET Q4 slightly to protect MOSFET Q4 when MOSFET Q4 is in the OFF state during large voltage spikes. MOSFET Q4 in the ON state is capable of dissipating large amounts of energy, but is susceptible to damage in the OFF state. Therefore, during voltage spikes, D13 and D14 momentarily provide sufficient voltage to the gate of MOSFET Q4 to marginally turn ON MOSFET Q4.

Line 40 is connected to pin 6 of driver unit U2 to provide a stable ground at line 40 during motor shutdown. Since power MOSFET Q3 is OFF at shutdown, line 40 provides a stable ground connection for connection J7 via driver chip U2. The stable ground in combination with the input to the gate of MOSFET Q4 ensures a sufficient voltage difference to assure that MOSFET Q4 fully switches to the ON state.

Motor controller 10 also monitors the condition of the supply battery (not shown) and provides a warning indication when battery voltage drops below a predetermined voltage threshold level. Processing unit U1 compares the battery output voltage sensed via input line 31 to a voltage threshold level sensed via input line 34 to provide a warning if the battery voltage drops below a predetermined level.

The battery voltage is sensed via input line 31 through a network comprising R8, R13, C2 and D2. The voltage divider comprising R8 and R13 provides a reduced voltage level to processing unit U1. Capacitor C2 is connected across resistor R8 to reduce any fluctuation to the signal to pin 1. Diode D2 is connected to node 23 to clamp the voltage at node 23 and prevent excessive input voltage to pin 1.

The voltage threshold level signals are provided via input line 34 through a voltage divider network comprising R6, R9 and R12. Similar to the current threshold levels, upper and lower voltage threshold levels are provided to pin 18. Again, the output of pin 10 alternates from +5 V and ground, to alternately place R6 in parallel with R9 and R12, to alternately provide the upper and lower voltage threshold levels.

Low battery voltage warning LED D4 is activated when the battery voltage drops below the upper voltage threshold level, in this case 21.5 V. To activate the warning, processing unit U1 provides a high output at output pin 6, which turns on transistor Q2 and allows current flow through LED D4. This alerts the user that the battery is nearly discharged. The remaining time varies according to conditions and can range from 5 to 10 minutes. Capacitor C5 reduces the fluctuation across transistor Q2.

If the battery voltage drops below the lower voltage threshold level, 19.25 V in this case, and remains below that level for about six seconds, processing unit U1 shuts down motor M1 using the procedure described above. The low battery voltage warning remains ON after shutdown in the event of a low voltage shut down to indicate to the user that the batteries are about 100% discharged and should be placed on recharge.

The battery is recharged by connecting the battery to a charging unit (not shown) through DC jack J3. As shown in FIG. 4, DC jack J3 includes an interlock which prevents motor M1 from being energized when the charging unit is connected to DC jack J3. The interlock is implemented using lines 38 and 39 which are in electrical contact with each other when the charger is disconnected, but are electrically disconnected when a charger is inserted into DC jack J3. Line 39 is connected to run/stop line 36, which is connected to pin 3 of processing unit U1, via wire harnesses J8 and J11. Line 36 informs processing unit U1 whether to run or stop motor M1. When bail switch is operated to pull node 36A to ground, the unit will run. Therefore, when the insertion of a charger in DC jack J3 is detected by the break in electrical contact between lines 38 and 39, processing unit U1 prevents or stops the operation of motor M1 using the procedure described above. A suitable DC jack model for this purpose is switchcraft.

Protection against overheating is provided by temperature sensing line 32 connected to pin 9 of processing unit U1. Temperature sensing line 32 includes thermistor RT1 having a resistance characteristic which varies with temperature. Thermistor RT1 is preferably disposed near power MOSFET Q3 which is one of the most temperature sensitive components of the present motor controller. Placing thermistor RT1 near power MOSFET Q3 allows control circuit 10 to be responsive to a combination of ambient temperature and heating caused by the current flowing through motor M1. Processing unit U1 automatically shuts down motor M1 using the process described above when the temperature sensed by thermistor RT1 exceeds a predetermined temperature threshold level. In this case, processing unit U1 is set to shut down motor M1 when the detected temperature reaches about 150° C.

Battery drain due to current through battery voltage sensor 20 and threshold level circuits 24 and 26 is minimized by the switched ground connection to MOSFET Q5. MOSFET Q5 has a source and drain connected to the switched ground and ground, respectively, and a gate connected to pin 12 of processing unit U1. Therefore, current flows through the respective sensing and threshold level circuits only when MOSFET Q5 is in the ON state. When motor M1 is operating, processing unit U1 turns MOSFET Q5 ON to allow current flow, but when motor M1 is shut down, processing unit U1 maintains MOSFET Q5 in the OFF state to prevent current flow thereby reducing the battery drain. Essentially, MOSFET Q5 is turned ON to enable the various voltage dividers whenever MOSFET Q3 is turned ON.

Operator-controlled bail switch 57 is connected to the present motor controller via wire harness connectors J8 and J11. As shown in FIG. 4, bail switch 57 is connected to input pins 4 and 8 of connector J11 and includes series connected contacts 60 and 61 associated with start button 58 and lever 59, respectively. As pin 4 is connected to run/stop line 36, it can be seen that the actuation of start button 58 and lever 59, thus the closing of contacts 60 and 61, will pull line 36 to ground, thereby allowing motor M1 to run. Although the present invention uses two serially connected contacts which close to allow motor M1 to run, it is to be understood that any arrangement of contacts connected to the run/stop line 36 which requires the operator to actuate start button 58 and lever 59 may be used.

Resonator Y1 is connected to pins 15 and 16 and provides the timing for processing unit U1.

The motor controller of the present invention as used with portable power equipment, such as a lawn and garden maintenance equipment which uses the modified bail switch, operates as follows. The user starts motor M1 by using a modified bail switch which requires the user to depress a start button and move a lever to the run position. The start button remains depressed as long as the operator presence control lever is in the run position. When motor M1 is started, processing unit U1 continuously monitors the current through motor M1.

If the motor current exceeds the lower current threshold level, processing unit U1 will actuate a high current warning indicator to notify the operator of a possible problem. If the motor current exceeds the upper current threshold level, processing unit U1 switches MOSFET Q3 rapidly to limit the current through motor M1. If the current limiting condition exists for about six continuous seconds, processing unit U1 shuts down motor M1 using power MOSFETs Q3 and Q4. Here, the high current warning indicator remains lit after shutdown to indicate that the motor was shut down due to high current.

If the battery voltage falls below the upper voltage threshold level, processing unit U1 activates a low battery voltage indicator. If the battery voltage drops below the lower voltage threshold level for more than about six continuous seconds, processing unit U1 shuts down motor M1 using power MOSFETSs Q3 and Q4. Here, the low voltage warning indicator remains lit after shutdown to indicate that the motor was shut down due to low battery voltage.

If the temperature sensed by the thermistor rises above a predetermined temperature threshold, processing unit U1 shuts down motor M1 using the procedure described above.

In each of the shutdown cases described, the operator may restart motor M1 by resetting the starting mechanism and repeating the starting sequence. In the case of the modified bail switch described above, the operator must release the operator presence control lever, depress the start button and move the lever to the run position.

The present invention may be practiced by using the following values for the circuit elements described above:

| | |
|---|---|
| R1 | 1 KΩ |
| R2 | 1 MΩ |
| R3 | 10 KΩ |
| R4 | 10 KΩ |
| R5 | 499 Ω |
| R6 | 22.6 KΩ |
| R7 | 7.32 KΩ |
| R8 | 4.02 KΩ |
| R9 | 2.37 KΩ |
| R10 | 5.76 KΩ |
| R11 | 1.00 KΩ |
| R12 | 4.99 KΩ |
| R13 | 20.0 KΩ |
| R14 | 1.5 KΩ |
| R15 | 1.5 KΩ |
| R16 | 51 KΩ |
| R17 | 100 Ω |
| R18 | 100 KΩ |
| R19 | 10 KΩ |
| R20 | 10 KΩ |
| R21 | 100 Ω |
| R22 | 16 KΩ |
| C1 | 1 µF |
| C2 | 1000 pF |
| C3 | .047 µF |
| C4 | 1000 pF |
| C5 | 1000 pF |
| C6 | .047 µF |
| C7 | 10 µF |
| C8 | .01 µF |
| C9 | .1 µF |
| D1 | DL4148 |
| D2 | DL5232H |
| D3 | 6A1 |
| D4 | LED/T1 |

-continued

| | |
|---|---|
| D5 | LED/T1 |
| D6 | DL5230B |
| D7 | DL4348 |
| D9 | DL4348 |
| D10 | DL5245B |
| D11 | DL5230B |
| D12 | DL5247B |
| D13 | DL5261B |
| D14 | DL4148 |
| Q1 | 2N3904 |
| Q2 | 2N3904 |
| Q3 | RPG70N06 |
| Q4 | RPG45N06 |
| Q5 | 2N7002LT1 |

While this invention has been described as having an exemplary design, the present invention may be further modified within the spirit and scope of this disclosure. For example, it should be understood that the signals generated by the circuitry of the present invention may take many forms, such as voltage levels as disclosed, logic levels, polarity, current levels, etc. This application is, therefore, intended to cover any variations, uses, or adaptations of the invention using its general principles. Further, this application is intended to cover such departures from the present disclosure as come within known or customary practice in the art to which this invention pertains.

What is claimed is:

1. A power tool adapted for lawn and garden maintenance, comprising:
   an electric motor having a rotating shaft;
   a rotating blade member driven by said rotating shaft; and
   a motor controller operatively coupled to said electric motor for controlling current through said electric motor, said motor controller comprising:
     a current sensor operatively connected to said electric motor, said current sensor having an output providing a load current signal corresponding to a load current level in said electric motor,
     a processing unit having an input and an output, said processing unit input connected to said current sensor output, said processing unit comparing said load current level with a current limit protection threshold level and generating a current limiting signal on said processing unit output when said load current level exceeds said current limit protection threshold level, and
     a first solid state switch connected in series with said electric motor, said first switch having an input operatively connected to said processing unit output, said first switch oscillating between a first state of said first switch which permits substantially normal current flow through said electric motor and a second state of said first switch which restricts current flow through said electric motor in response to the presence of said current limiting signal on said first switch input, whereby current through said electric motor is maintained below a predetermined current limit.

2. The power tool according to claim 1, wherein said processing unit generates a shutdown signal on said processing unit output when said load current level continuously exceeds said limit protection current threshold level for a predetermined period of time, said first switch remaining in said second state of said first switch in response to the presence of said shutdown signal, whereby said motor is de-energized.

3. The power tool according to claim 2, wherein said predetermined period of time is about six seconds.

4. The power tool according to claim 2, further comprising a second solid state switch connected in parallel with said electric motor, said second switch having an input operatively connected to a second processing unit output, wherein said second switch changes between a first state of said second switch which permits substantially normal current flow through said second switch and a second state of said second switch which restricts current flow through said second switch in response to the presence of said shutdown signal on said processing unit output to stop the rotation of said shaft within a predetermined stop time.

5. The power tool according to claim 4, wherein said predetermined stop time is less than three seconds.

6. The power tool according to claim 4, wherein said first and second solid state switches comprise power MOSFETs.

7. The power tool according to claim 1, further comprising a high current warning indicator having an input connected to a third processing unit output, said processing unit comparing said load current with a current warning threshold level and actuating said high current warning signal indicator when said load current level exceeds said current warning threshold level.

8. A power tool adapted for lawn and garden maintenance, comprising:
   an electric motor having a rotating shaft;
   a working member having an edge portion operatively coupled to said rotating shaft to rotate when said electric motor is energized;
   a battery operatively coupled to said electric motor; and
   a motor controller operatively coupled to said electric motor for controlling current through said electric motor, said motor controller comprising,
       a current sensor operatively connected to said electric motor, said current sensor having an output carrying a load current signal corresponding to a load current level in said electric motor,
       a processing unit having an input and an output, said processing unit input connected to said current sensor output, said processing unit comparing said load current level with a current limit protection threshold level and generating a current limiting signal on said processing unit output when said load current level exceeds said current limit protection threshold level, and
       a first solid state switch connected in series with said electric motor and said battery, said first switch having an input operatively connected to said processing unit output, said first switch oscillating between a first state of said first switch which permits substantially normal current flow through said electric motor and a second state of said first switch which restricts current flow through said electric motor in response to the presence of said current limiting signal on said first switch input, whereby current through said electric motor is maintained below a predetermined current limit.

9. The power tool according to claim 8, wherein said processing unit generates a shutdown signal on said processing unit output when said load current level continuously exceeds said current limit protection threshold level for a predetermined period of time, said first switch remaining in said second state of said first switch in response to the presence of said shutdown signal, whereby said motor is deenergized.

10. The power tool according to claim 9, further comprising a second solid state switch connected in parallel with said electric motor, said second switch having an input operatively connected to a second processing unit output, wherein said second switch changes between a first state of said second switch which permits substantially normal current flow through said second switch and a second state of said second switch which restricts current flow through said second switch in response to the presence of said shutdown signal on said processing unit output to stop the rotation of said shaft within a predetermined stop time.

11. The power tool according to claim 10, wherein said predetermined stop time is less than three seconds.

12. The power tool according to claim 10, wherein said first and second solid state switches comprise power MOSFETs.

13. The power tool according to claim 10, further comprising a high current warning indicator having an input connected to a third processing unit output, said processing unit comparing said load current level with a current warning threshold level and actuating said high current warning indicator when said load current level exceeds said current warning threshold level.

14. The power tool according to claim 10, further comprising a battery voltage sensor operatively coupled to said battery and a low battery voltage indicator coupled to said processing unit, said battery voltage sensor having an output providing a battery voltage signal corresponding to a voltage level of said battery, said battery voltage sensor output connected to a second processing unit input, said processing unit comparing said battery voltage level with a first voltage threshold level and actuating said low battery warning indicator when said battery voltage signal is below said first voltage threshold level.

15. The power tool according to claim 14, wherein said processing unit compares said voltage level with a second voltage threshold level and generating said shutdown signal on said processing unit output when said voltage level is below said second voltage threshold level for a second predetermined period of time.

16. The power tool according to claim 15, further comprising a temperature sensor operatively connected to said processing unit, said temperature sensor having an output providing a temperature signal corresponding to a temperature around said temperature sensor, said processing unit generating said shutdown signal when said temperature exceeds a predetermined temperature level.

17. The power tool according to claim 8, further comprising a recharger and a battery recharger attachment member operatively coupled to said processing unit, said processing unit generating a shutdown signal on said processing unit output when said recharger is connected to said battery recharger attachment member.

18. A motor controller for controlling current through an electric motor, comprising:
    a current sensor operatively connected to the electric motor, said current sensor having an output carrying a load current signal corresponding to a load current level in the motor;
    a processing unit having an input and an output, said processing unit input connected to said current sensor output, said processing unit comparing said load current level with a current limit protection threshold level and generating a current limiting signal on said processing unit output when said load current level exceeds said current limit protection threshold level; and
    a first solid state switch connected in series with the motor, said first switch having an input operatively connected to said processing unit output, said first switch oscillating between a first on state of said first switch which permits substantially normal current flow through said electric motor and a second state of said first switch which restricts current flow through said electric motor in response to the presence of said current limiting signal on said first switch input, whereby current through said electric motor is maintained below a predetermined current limit.

19. The motor controller according to claim 18, wherein said processing unit generates a shutdown signal on said processing unit output when said load current level exceeds said current limit protection threshold level for a predetermined period of time, said first switch remaining in said second state of said first switch in response to the presence of said shutdown signal, whereby the motor is de-energized.

20. The motor controller according to claim 19, further comprising a second solid state switch connected in parallel with the electric motor, said second switch having an input operatively connected to a second processing unit output, wherein said second switch oscillates between a first state of said second switch which permits substantially normal current flow through said second switch and a second state of said second switch which restricts current flow through said second solid state switch in response to the presence of said shutdown signal on said processing unit output to stop the rotation of a shaft associated with the motor within a predetermined period of time.

* * * * *